(12) United States Patent
Schmidt et al.

(10) Patent No.: US 10,184,541 B2
(45) Date of Patent: Jan. 22, 2019

(54) FLANGE FOR CONNECTING A VIBRATION DAMPER TUBE TO A MODULE TUBE OF A VIBRATION DAMPER

(71) Applicants: ThyssenKrupp Bilstein GmbH, Ennepetal (DE); ThyssenKrupp AG, Essen (DE)

(72) Inventors: Klaus Schmidt, Odenthal (DE); Michael Fritz, Breckerfeld (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 71 days.

(21) Appl. No.: 15/316,037

(22) PCT Filed: Jun. 3, 2015

(86) PCT No.: PCT/EP2015/062357
§ 371 (c)(1),
(2) Date: Dec. 2, 2016

(87) PCT Pub. No.: WO2015/185612
PCT Pub. Date: Dec. 10, 2015

(65) Prior Publication Data
US 2017/0097062 A1    Apr. 6, 2017

(30) Foreign Application Priority Data

Jun. 6, 2014    (DE) .................. 10 2014 108 027

(51) Int. Cl.
*F16F 9/32*    (2006.01)

(52) U.S. Cl.
CPC ............ *F16F 9/3235* (2013.01); *F16F 9/325* (2013.01)

(58) Field of Classification Search
CPC .. F16F 9/32; F16F 9/325; F16F 9/3207; F16F 2230/0005
See application file for complete search history.

(56) References Cited

U.S. PATENT DOCUMENTS

| 2008/0087512 A1 | 4/2008 | Vanhees et al. |
| 2008/0245630 A1 | 10/2008 | Le |

(Continued)

FOREIGN PATENT DOCUMENTS

| CN | 104698962 A | 6/2015 |
| CN | 104968961 A | 10/2015 |

(Continued)

OTHER PUBLICATIONS

English translation of International Search Report for International patent application No. PCT/EP20151062357; dated Sep. 29, 2015.

(Continued)

*Primary Examiner* — Melanie Torres Williams
(74) *Attorney, Agent, or Firm* — Thyssenkrupp North America, Inc.

(57) ABSTRACT

A flange for connecting a vibration damper tube to a module tube of a vibration damper may include one or more fluid ducts, by which the module tube is fluidically coupled to the vibration damper tube. The flange may further include a plastic body in which the fluid duct for the fluidic coupling is formed and wherein connection elements are provided that extend between the vibration damper tube and the module tube. The connection elements may form a retaining connection between the vibration damper tube and the module tube. The plastic body may comprise two opposite side walls, and the connection elements may be formed by metal plates arranged on the side walls. The plastic body may also comprise retaining means for the retaining of the plates.

19 Claims, 2 Drawing Sheets

(56) References Cited

U.S. PATENT DOCUMENTS

2009/0032346 A1 2/2009 Nowaczyk
2015/0369324 A1 12/2015 Schmidt et al.

FOREIGN PATENT DOCUMENTS

| | | |
|---|---|---|
| DE | 195 27 849 C1 | 8/1996 |
| DE | 10 2004 034 725 A1 | 3/2005 |
| DE | 103 55 151 A1 | 6/2005 |
| DE | 11 2007 002 377 T5 | 8/2009 |
| DE | 10 2008 062 162 B3 | 6/2010 |
| DE | 11 2008 001 980 T5 | 7/2010 |
| DE | 10 2012 111 938 A1 | 6/2014 |
| EP | 1508723 A | 2/2005 |
| WO | WO-2014086897 A1 * | 6/2014 ............ F16F 9/3235 |

OTHER PUBLICATIONS

English language Abstract of DE 103 55 151 A1.
English language Abstract of DE 10 2004 034 725 A1.
English language Abstract of DE 195 27 849 C1.
English language Abstract of DE 10 2008 062 162 B3.

* cited by examiner

FLANGE FOR CONNECTING A VIBRATION DAMPER TUBE TO A MODULE TUBE OF A VIBRATION DAMPER

CROSS REFERENCE TO RELATED APPLICATIONS

This application is a U.S. National Stage Entry of International Patent Application Serial Number PCT/EP2015/062357, filed Jun. 3, 2015, which claims priority to German Patent Application No. DE 10 2014 108 027.0 filed Jun. 6, 2014, the entire contents of both of which are incorporated herein by reference.

FIELD

The present disclosure generally relates to vibration dampers and mechanisms for connecting a components of vibration dampers.

BACKGROUND

From DE 11 2007 002 377 T5 there is known a vibration damper with a vibration damper tube and there is provided an external module tube in which an additional valve arrangement is received. The module tube extends perpendicular to the vibration damper tube, and the flange for connecting the module tube to the vibration damper tube is formed by the module tube itself.

From DE 11 2008 001 980 T5 there is known a vibration damper with a vibration damper tube and with an external module tube in which a valve body arrangement is received. Between the vibration damper tube and the module tube are situated transfer rings, which form a flange between the two tubes, said flange being retained by the module tube on the vibration damper tube. Through the transfer rings there are formed fluid ducts in order to connect the valve body arrangement in the external module tube to the vibration damper tube. The maximum possible spacing between the module tube and the vibration damper tube here is structurally limited by the design of the transfer rings.

The connection between the module tube and the vibration damper tube must play a mechanical retaining role, besides the fluidic connection role. Because of the heavy dynamic loading of a vibration damper tube, great mechanical strength of the module tube on the vibration damper tube is required, and if the spacing between the module tube and the vibration damper tube needs to be increased, for example, for design reasons, then the flange connection between the module tube and the vibration damper tube can no longer be formed only by transfer rings, since these are not sufficiently mechanically loadable.

Although a flange can be made from a metallic material affording a good strength between the module tube and the vibration damper tube, especially when the tubes are welded to the flange, a flange made from a solid metallic material for example can quickly have a large weight. Especially when vibration damper tubes are used as unsprung masses on a vehicle it is important to accomplish a low weight of the vibration damper. A flange made from a plastic material would be lighter, but it would not achieve the required strength, and the module tube would not be mounted with adequate mechanical strength on the vibration damper tube.

For example, if a flange is made of a solid metallic material, the further problem arises of the sealing of the fluid ducts to the tube bodies. The fluid ducts must pass through the flange and be brought into connection with openings which are made in the vibration damper tube and in the module tube. If the connection between the flange and the tubes is formed by a welded connection, the difficulty arises of the seal between the fluid ducts in the flange and the outside of the tubes.

By a combination of a plastic body, in which at least one fluid duct is formed, and by additional connection elements the weight of a flange can be reduced, although the design and especially the mounting of the flange can be made more difficult, even with higher. For example, DE 103 55 151 A1 shows a flange for connecting a vibration damper tube to a module tube, wherein a plastic body is clamped between the two tubes, and then two side connection elements of a metal material must be welded onto the outside of the tubes. This requires a costly welding device.

DE 10 2004 034 725 A1 shows another variant of a flange with a connection piece and with a carrier, wherein the carrier forms a connection element of H shape. To produce the H-shaped connection element, several stamping and bending operations and further welding processes are needed, so that the flange formed in this way has a costly fabrication.

Finally, DE 195 27 849 C1 shows a flange for connecting a vibration damper tube to an external module tube of a vibration damper, wherein a sleeve-like transition body with a respective funnel-shaped opening to the module tube and vibration damper tube is provided. The transition body has to be made in a costly manner by a forming process and the contact surfaces of the transition body must be adapted to the envelope surfaces of the tubes. While this produces a connection element which can be welded onto the tubes, the plastic element to be used in the transition body, known as a support body, is designed as an individual part and it must be installed in the transition body after the latter has already been welded onto the module tube, for example. Consequently, the welding processes have to be interrupted by the inserting of the plastic body, making the mounting of the flange more difficult.

DETAILED DESCRIPTION

Figure 1:
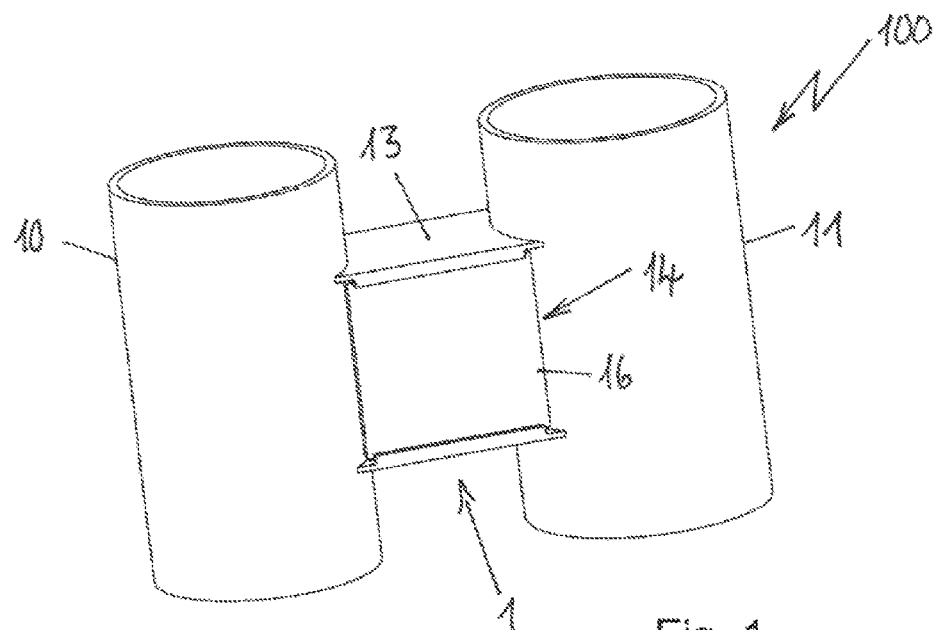
FIG. 1 is a perspective, sectional, and schematic view of an example vibration damper with an example flange between an example damper tube and an example module tube.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally concerns flanges for connecting a vibration damper tube to a module tube of a vibration damper. In some examples, a flange may comprise one or more fluid ducts, by which the module tube is fluidically coupled to the vibration damper tube. The flange may also include a plastic body in which the fluid ducts for the fluidic coupling are formed. The plastic body may further include connection elements that extend between the vibration damper tube and the module tube and form a retaining connection between the vibration damper tube and the module tube. Moreover, the present disclosure concerns a vibration damper with such a flange.

The problem which the invention proposes to solve is the development of a flange for connecting a vibration damper tube to a module tube of a vibration damper and the providing of a vibration damper with an improved flange, wherein the flange should have a simple design and be easy to install. In particular, it should be possible to provide the flange as an individually manipulated subassembly for mounting on the vibration damper tube and on the module tube.

The invention incorporates the teaching that the plastic body comprises two opposite side walls and that the connection elements are formed by metallic plates arranged on the side walls, the plastic body comprising retaining means for the retaining of the plates.

With the development of a flange according to the invention for the connecting of a vibration tube to a module tube, the benefit is obtained that the flange can be designed in simple manner and can consist solely of a plastic body and for example two connection elements. The connection elements according to the invention can be arranged prior to the arranging of the flange on the vibration damper and on the plastic body, so that one obtains an easily manipulated subassembly of the plastic body and for example two connection elements for the mounting of the flange, and the connecting of the connection elements to the vibration damper tube and/or to the module tube can be done in an easier manner. For example, no costly welding device has to be provided if the flange according to the invention needs to be connected to the module tube and/or vibration damper tube, since the connection elements to be welded onto the tubes are already retained by the plastic body and especially advantageously they are also already oriented. This benefit is achieved only by the retaining arrangement according to the invention of the connection elements designed as plates on the plastic body.

With further benefit, the retaining means can be formed by grooves configured on the plastic body. The grooves can be configured as guide grooves, and the plates can be inserted into the guide grooves from the side, for example. Alternatively, the grooves can also be configured such that the metal plates are pressed against the side walls of the plastic body, and the metal plates can snap into the grooves or slide into them so that the metal plates are clipped against the plastic body, for example.

In particular, the grooves can limit the side walls at two opposite edges of the plastic body and run parallel to each other. With special benefit, two grooves which are spaced apart can be provided for the fastening of each of the metal plates, and the plates can be pressed into them by associated side edges.

With further benefit, the plates can be clamped into and/or between the opposite retaining means and thus are arranged in self-retaining manner on the plastic body. For this, the width of the grooves can be smaller than the thickness of the plates, for example. Alternatively or additionally, the spacing between the opposite grooves limiting the side wall can be less than the height of the plates. The plastic body can be formed from an elastic rubber material, such as an elastomer, or the plastic body comprises a plastic having a greater shape stability. The clamping action of the plates on the plastic body between the grooves can be designed such that the plastic plates need to be press-fitted properly into the grooves. This produces a special retaining action of the metal plates on the plastic body.

With further benefit, the plates can lie substantially against the opposite side walls on the plastic body and entirely cover them. The plastic body can preferably be cube-shaped, while the end face tube contact surfaces of the plastic body, which are brought to bear against the outer envelope surface of the vibration damper tube and the module tube, can have a corresponding concave configuration. The side plates border on the sides of the cube-shaped plastic body, and the metal plates can preferably be flat in configuration and extend straight between the tubes of the vibration damper tube and the module.

With special benefit, the metal plates can be square in configuration, so that when assembled it is not necessary to pay attention to the orientation in which the square plates are inserted into the guide grooves.

The plates can have two opposite end faces, where a first end face can be welded to the vibration damper tube and a second end face to the module tube. The opposite end faces form the limitation of the metal plates in a transverse direction, while the opposite edges which are inserted into the grooves on the plastic body form the limitation of the rectangular metal plate transversely to the end faces. The metal plates need not necessarily be rectangular or square in configuration, and a contour deviating from a straight edge is also conceivable, with which the metal plates are arranged on the plastic body via the retaining means. However, the end faces for contact against the module tube or the vibration damper tube should preferably be straight in configuration, so that a weld seam can be drawn across the end faces in order to weld the plates to the tubes by the end faces.

With special benefit, the retaining means can be designed with a wrap-around strip at the edges of the plastic body, while the wrap-around strips can be shorter in their lengthwise extension than the grooves. In this way, the end faces of the plates can be clearly exposed over their entire height, and if a weld seam is produced to weld the plates to the tubes the end faces of the plates will be clearly exposed in the area adjacent to the tubes, without a wrap-around strip of the retaining means to form the grooves covering the welding region of the end faces.

The present invention is furthermore addressed to a vibration damper with a vibration damper tube and with a module tube, wherein the module tube is attached by a flange to the vibration damper tube, and wherein the flange comprises one or more fluid ducts, through which the module tube is fluidically coupled to the vibration damper tube, and wherein the flange comprises a plastic body in which the fluid duct for the fluidic coupling is formed and wherein the flange comprises connection elements which extend between the vibration damper tube and the module tube and by which a maintaining connection is formed between the vibration damper tube and the module tube. According to the invention, a plastic body with two opposite side walls is proposed and the connection elements can form metal plates arranged on the side walls, wherein the plastic body comprises retaining means for the retaining of the plates. The further features and associated benefits mentioned above in connection with a flange apply equally to the vibration damper with such a flange according to the invention.

FIG. 1 shows in a perspective view an exemplary embodiment of a vibration damper 100 with a vibration damper tube 10 and an external module tube 11, and between the vibration damper tube 10 and the module tube 11 is arranged a flange 1. The flange 1 joins the module tube 11 to the vibration damper tube 10, so that the module tube 11 is fitted by the flange 1 in a retained manner on the vibration damper tube 10. The vibration damper tube 10 and the module tube 11 are only shown schematically for a section, and it is possible to receive in the module tube 11 a valve subassembly, for example, which communicates fluidically through fluid ducts in the flange 1 with the vibration damper tube 10. Alternatively, an additional damper volume can be formed in the module tube 11, which likewise requires fluid ducts in the flange 1 in order to communicate fluidically with the vibration damper tube 10. A preferred sample embodiment of the flange 1 with the features of the present invention is described more closely in FIGS. 2 and 3 below.

Figure 2:
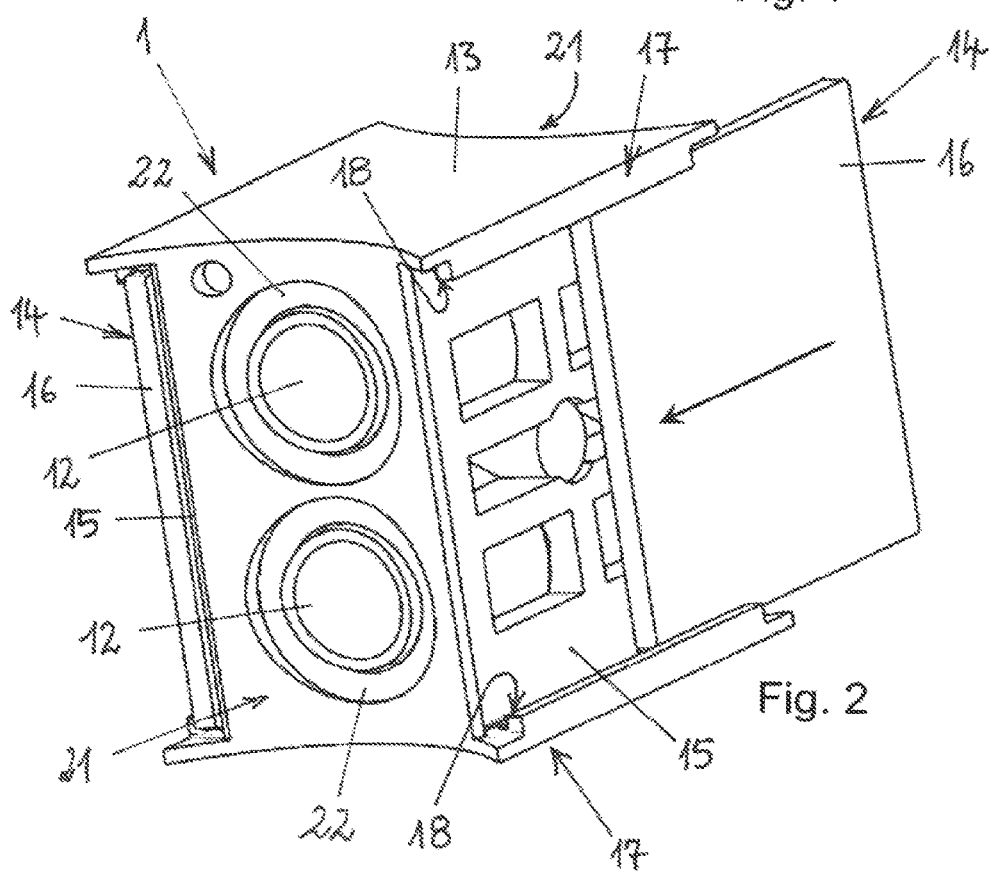
FIG. 2 is a perspective view of an example flange with platelike connection elements that are arranged on a plastic body.

FIG. 2 shows an exemplary embodiment of a flange 1, composed of a substantially cube-shaped plastic body 13 and of connection elements 14. The plastic body 13 is configured so that, when the module tube 11 is arranged on the vibration damper tube 10, it extends entirely between the two tubes. For this, the plastic body 13 has tube contact surfaces 21, by which the plastic body 13 lies against the outer envelope surfaces of the vibration tube 10 and the module tube 11. Consequently, the tube contact surfaces 21 of the plastic body 13 are concave in shape and thus can lie entirely against the surface of the tubes 10, 11.

Between the tube contact surfaces 21 there extend two fluid ducts 12 (shown as an example) through the plastic body 13, in order to connect the module tube 11 fluidically to the vibration damper tube 10. The fluid ducts 12 can be formed directly into the plastic body 13 or fluid ducts 12 comprise metallic tube inserts which are introduced into the plastic body 13, for example, by injection molding around them. At the mouth openings of the fluid ducts 12 into the tube contact surfaces 21 there are installed sealing rings 22 (not shown in detail), in order to seal off the fluid ducts 12 against the tubes 10 and 11.

At the side, the plastic body 13 is limited by side walls 15, which are substantially planar, and cutouts are made in the side walls 15 of the plastic body 13 merely to minimize their weight.

The side walls 15 are limited in their height direction by two edges, which are configured as retaining means 17 for the retaining arrangement of the connection elements 14 on the plastic body 13. The retaining means 17 serve for a clamping of the connection elements 14 designed as plates 16. The plates 16 consist of a weldable metallic material, e.g. for good weldability, the same as the vibration tube 10 and the module tube 11. The plates 16, for example, are square in configuration, so that the plates 16 can be inserted into the retaining means 17 regardless of their orientation. The retaining means 17 are configured as grooves 18 for example, into which the plates 16 can be introduced. For this, the grooves 18 extend at the bottom side and the top side of the plastic body 13 parallel to each other. The spacing of the two grooves 18, however, can be slightly smaller than the height of the plates 16, so that a clamping action is produced. Likewise, a clamping action can be produced by grooves 18 which are slightly narrower than the thicknesses of the plates 16. The arrow indicated in the metal plate 16 shows the joining movement to insert the plate 16 into the grooves 18 configured as a guide groove.

Figure 3:
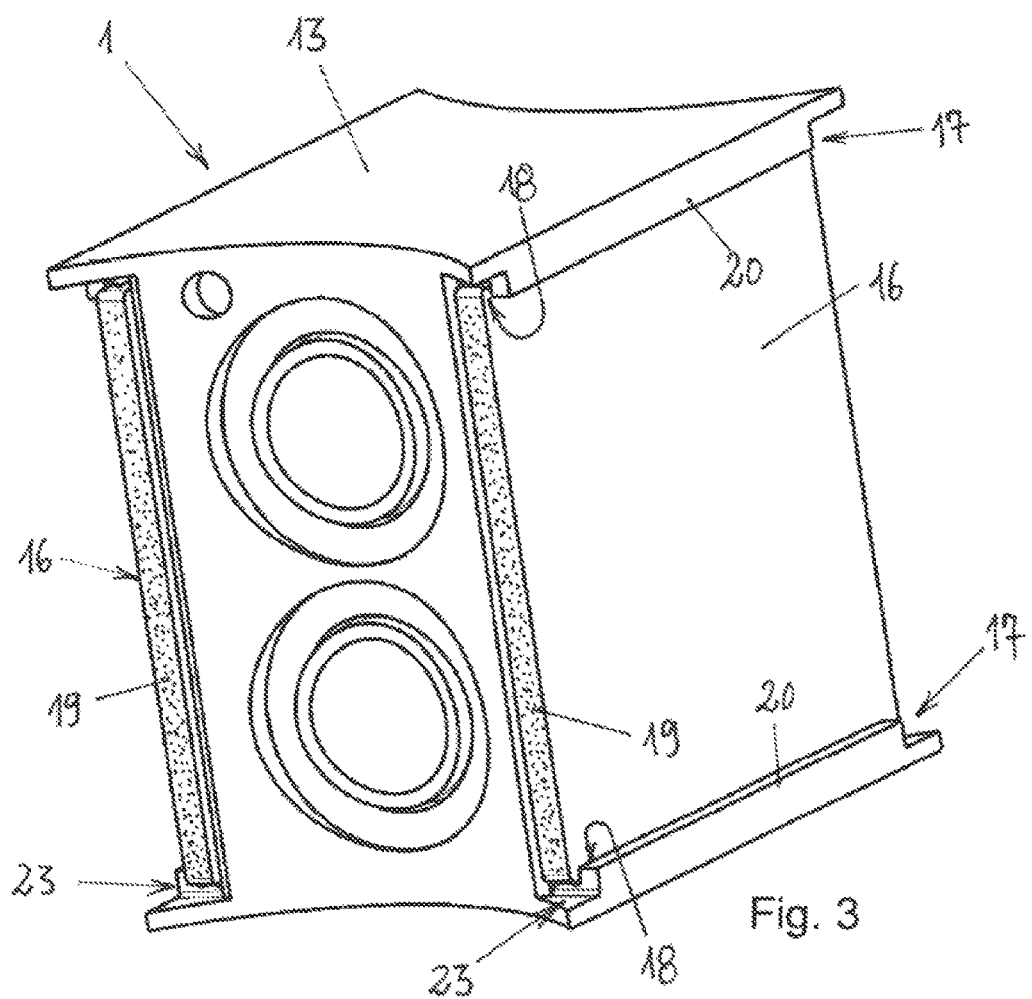
FIG. 3 is a perspective view of an example flange that can be fitted to a vibration damper tube and to a module tube as shown in FIG. 1.

FIG. 3 shows a finished flange 1 with a plastic body 13, on which two metal plates 16 are arranged. The plates 16 are retained in the grooves 18 which are formed by wrap-around strips 20, so that the wrap-around strips 20 grasp the plates along their lengthwise edges and thus retain them. Transversely to the lengthwise edges, the plates 16 are limited by end faces 19, by which the plates 16 can be welded to the vibration damper tube 10 and the module tube 11. The flange 1 can be brought up as a finished preassembled unit to the vibration damper tube 10 and to the module tube 11, and the figure shows the wrap-around strips 20 for the forming of the grooves 18, which are shorter than the actual grooves 18. This produces free cutouts 23 in front, so that the end faces 19 are accessible from the side over their full height, for example, to a welding device.

The invention is not limited in its embodiment to the above indicated preferred sample embodiment. Instead, a number of variants are conceivable, making use of the presented solution even with fundamentally different embodiments. All features and/or benefits emerging from the claims, the description or the drawings, including design features or spatial arrangements, can be significant to the invention either by themselves or in the most various of combinations.

LIST OF REFERENCE SYMBOLS

100 Vibration damper
1 Flange
10 Vibration damper tube
11 Module tube
12 Fluid duct
13 Plastic body
14 Connection element
15 Side wall
16 Plate
17 Retaining means
18 Groove
19 End face
20 Wrap-around strip
21 Tube contact surface
22 Sealing ring

What is claimed is:

1. A flange for connecting a vibration damper tube to a module tube of a vibration damper, the flange comprising:
   connection elements that comprise metal plates that extend between the vibration damper tube and the module tube and form a retaining connection between the vibration damper tube and the module tube,
   a plastic body comprising:
     two opposite side walls, wherein the metal plates are disposed on the two opposite side walls, and
     retaining means for retaining the metal plates; and
   a fluid duct disposed or formed in the plastic body, wherein the fluid duct fluidically couples the module tube to the vibration damper tube.

2. The flange of claim 1 wherein the retaining means is formed by grooves configured on the plastic body.

3. The flange of claim 2 wherein the grooves are configured as guide grooves into which the metal plates are inserted.

4. The flange of claim 2 wherein the grooves are parallel and limit the two opposite side walls at two opposite edges of the plastic body.

5. The flange of claim 1 wherein the metal plates are clamped into or between the retaining means and are disposed in a self-retaining manner on the plastic body.

6. The flange of claim 1 wherein the metal plates substantially cover the two opposite side walls of the plastic body.

7. The flange of claim 1 wherein the metal plates are flat and square.

8. The flange of claim 1 wherein each of the metal plates has two opposite end faces, wherein a first end face is welded to the vibration damper tube and a second end face is welded to the module tube.

9. The flange of claim 1 wherein the retaining means is formed by grooves configured on the plastic body, wherein the retaining means comprise wrap-around strips at edges of the plastic body that extend in a lengthwise direction between the vibration damper tube and the module tube, wherein the wrap-around strips are shorter than the grooves in the lengthwise direction.

10. The flange of claim 1 wherein the retaining means is formed by grooves configured on the plastic body, wherein a width of the grooves is smaller than a thickness of the metal plates.

11. The flange of claim 1 wherein the retaining means is formed by grooves configured on the plastic body, wherein a space between two of the grooves that limit one of the two opposite sidewalls is less than a height of the metal plates.

12. A vibration damper with a vibration damper tube and a module tube, wherein the module tube is attached by a flange to the vibration damper tube, with the flange comprising:
  connection elements that comprise metal plates that extend between the vibration damper tube and the module tube and form a retaining connection between the vibration damper tube and the module tube,
  a plastic body that comprises:
    two opposite side walls, wherein the metal plates are disposed on the two opposite side walls, and
    retaining means for retaining the metal plates; and
  a fluid duct disposed or formed in the plastic body, wherein the fluid duct fluidically couples the module tube to the vibration damper tube.

13. A flange for a vibration damper, the flange comprising:
  a connection element comprising a plate and extending between a first tube and a second tube of the vibration damper, wherein the connection element retains the first tube to the second tube,
  a plastic body that comprises:
    opposing side walls, wherein the plate is disposed on at least one of the opposing side walls, and
    grooves that retain the plate; and
  a fluid duct disposed or formed in the plastic body, wherein the fluid duct fluidically couples the first tube to the second tube.

14. The flange of claim 13 wherein the plate is metal and substantially covers the at least one of the opposing side walls on which the plate is disposed.

15. The flange of claim 13 wherein the plate has two opposite end faces, wherein a first end face is welded to the first tube and a second end face is welded to the second tube.

16. The flange of claim 13 wherein the grooves comprise wrap-around strips at edges of the plastic body that extend in a lengthwise direction between the first tube and the second tube, wherein the wrap-around strips are shorter than the grooves in the lengthwise direction.

17. The flange of claim 13 wherein a width of the grooves is smaller than a thickness of the plate.

18. The flange of claim 13 wherein a space between two of the grooves that limit one of the opposing sidewalls is less than a height of the plate.

19. The flange of claim 13 wherein the plate is flat and square.

* * * * *